United States Patent [19]

Albin

[11] Patent Number: 5,015,129

[45] Date of Patent: May 14, 1991

[54] ADAPTER FOR BATTERY-POWERED SCREWDRIVER TO ATTACH DRILL CHUCK

[76] Inventor: Stephen D. Albin, 797 Manor Way, Los Altos, Calif. 94022

[21] Appl. No.: 572,614

[22] Filed: Aug. 23, 1990

[51] Int. Cl.[5] .............................................. B23B 31/10

[52] U.S. Cl. .................................... 408/239 A; 81/54; 279/1 A

[58] Field of Search ............... 408/241 R, 238, 239 R, 408/239 A, 226; 279/1 A, 83; 81/125, 177.2, 177.1, 475, 52, 54; 7/158; 403/24

[56] References Cited

U.S. PATENT DOCUMENTS

| | | | |
|---|---|---|---|
| 2,714,026 | 7/1955 | Schultz | 279/83 |
| 3,843,143 | 10/1974 | Laxson | 279/1 A |
| 4,224,969 | 9/1980 | Plessner | 279/1 A X |
| 4,766,783 | 8/1988 | Stanich et al. | 81/54 |
| 4,874,181 | 10/1989 | Hsu | 408/239 A |
| 4,944,641 | 7/1990 | Alves | 408/239 A |

FOREIGN PATENT DOCUMENTS

| | | | |
|---|---|---|---|
| 3338060 | 5/1985 | Fed. Rep. of Germany | 279/1 A |
| 2214453 | 9/1989 | United Kingdom | 279/1 A |

*Primary Examiner*—William Briggs

*Attorney, Agent, or Firm*—Julian Caplan

[57] ABSTRACT

Commercially available battery-powered screwdriver output shafts are round and have hexagonal bores to receive the hexagonal shanks of screwdriver blades. An adapter has one end shaped to receive and engage such an output shaft. The opposite end is externally threaded to receive an internally threaded chuck which holds round shank twist drills. Thus, a power screwdriver may be used as a drill. An optional second adapter having one end shaped hexagonal to receive the screwdriver output shaft and be held in place by a set screw and has its opposite end shaped to be permanently attached to the first-mentioned adapter. This facilitates attaching and detaching the chuck.

10 Claims, 2 Drawing Sheets

ADAPTER FOR BATTERY-POWERED SCREWDRIVER TO ATTACH DRILL CHUCK

BACKGROUND OF THE INVENTION

1. Field of the Invention

This invention relates to a new and improved adapter for a battery powered screwdriver in order to permit a conventional drill chuck to be driven thereby.

2. Description of Related Art

Battery powered screwdrivers have been improved recently so that they have sufficient torque and may be run for a sufficient length of time to perform drilling operations. Removable three jaw drill chucks have commonly been used on hand and power operated drills. The present invention comprises an adapter which permits such a drill chuck to be driven by a power screwdriver and, more particularly, so that the drill bit may be backed out of the drilled hole without disconnecting the drill bit from the chuck.

SUMMARY OF THE INVENTION

The output shaft of a battery operated screwdriver is formed with a socket shaped to receive the hexagonal cross-section shank of a screwdriver blade and has various retainer means therein to retain the blade in place. These retainer means frequently do not function satisfactorily to back out a drill bit. On the other hand, removable drill chucks have externally threaded round shafts. The chucks accept conventional round cross-section wire twist drills which, of course, will not fit directly into the socket of the output shaft of the screwdriver.

Accordingly, the present invention provides an adapter permitting conventional power screwdriver output shafts to drive the round cross-section shanks of drills. The adapter has one end shaped to fit into the socket of the screwdriver output shaft and to be secured thereto by a set screw shaft, or the like, and its opposite end internally threaded to receive a threaded shaft of a drill chuck.

As an optional feature, to facilitate rapid interchange of drills and screwdrivers, a second adapter may be more or less permanently secured to the first mentioned adapter, the second adapter being formed with an elongated, hexagonal extension shaped to be received by the output shaft of the screwdriver.

BRIEF DESCRIPTION OF THE DRAWINGS

The accompanying drawings, which are incorporated in and form a part of this specification, illustrate embodiments of the invention and, together with the description, serve to explain the principles of the invention.

DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 3:
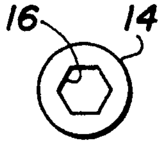
FIGS. 3, 4 and 5 are, respectively, end views as viewed along the lines 3—3, 4—4 and 5—5 of FIG. 2.
Figure 4:
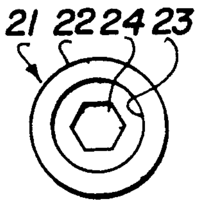
Figure 5:
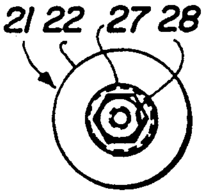

Battery powered screwdriver 11 has a handle 12 carrying an off-on switch 13 and having output shaft 14 at one end. As best shown in FIG. 3, shaft 16 has a hexagonal socket 16 which normally receives the hexagonal shank of a screwdriver blade. Shaft 14 has internal means (not shown) of one or more different types which retain the shank of the screwdriver blade against unintentional removal. These means do not satisfactorily secure a drill bit, particularly when this bit is being backed out a hole.

Figure 6:
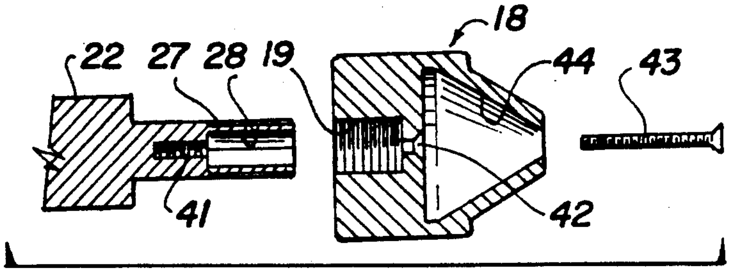
FIG. 6 is an enlarged exploded sectional view taken substantially on line 6—6 of FIG. 2.

Drill chuck 18 is of conventional type having usually three jaws which grip the round cross-sectional shank of a wire twist drill. As shown in FIG. 6, chuck 18 has an internally threaded bore 19 whereby it may be attached to a hand or motor driven drill. Details of the drill are not illustrated or described since they are well known in the drill art and there are a number of different types of jaw chucks.

Figure 1:
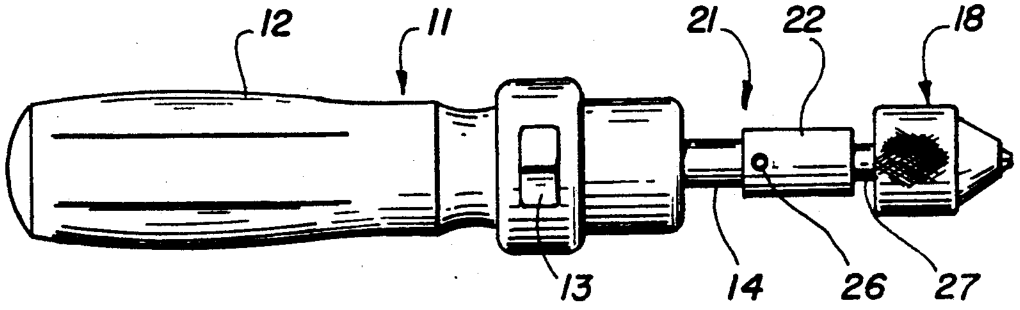
FIG. 1 is a side elevational view showing the adapter in place.
Figure 2:
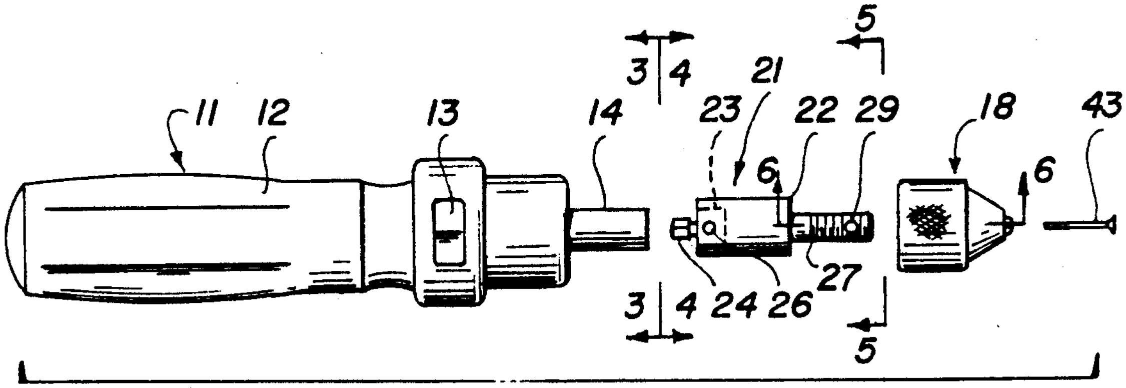
FIG. 2 is an exploded view showing the individual parts of the assembly of FIG. 1.

Adapter 21 of the present invention has a body 21 and is formed at one end (the left end as viewed in FIG. 2) with a round socket 23 having an inside diameter substantially equal to the outside diameter of the shaft 14. Centrally located in the socket 23 and projecting outwardly from the end thereof is a hexagonal stem 24 dimensioned to fit into the socket 16 and to be held therein by whatever means is provided in the screwdriver 11 for retaining a screwdriver blade therein. A set screw 26 is threaded into the body 22 to engage the shaft 14 and secure the adapter 21 on the shaft 14.

On the end of body 22 opposite stem 24 is an externally threaded shank 27 which is formed with a hexagonal socket 28 identical in cross-section to the socket 16. Set screw 29 is recessed into shank 27 in such a way that it does not interfere with the threads on the shank 27. Accordingly, when the adapter 21 is affixed to the shaft 14, either a screwdriver blade may be received in the socket 18 and held in place by set screw 29 or the threaded shank 27 may be screwed into threaded end 19 of drill chuck 18 which, in turn, holds a conventional drill in place in such a way that it may be driven by the screwdriver 12.

An optional feature is shown in FIG. 6 to prevent chuck 18 from unintentionally opening or unscrewing from shank 27 when backing off the drill. Thus inward of socket 28 a tapped hole 41 is formed—the threads being reversed from the threads of shank 27. A hole 42 is formed in the cavity 44 of chuck 18 which extends into threaded bore 19. Left-hand thread screw 43 fits through hole 42 and is threaded into hole 41. Thus chuck 18 cannot be unintentionally detached from adapter 21.

Figure 7:
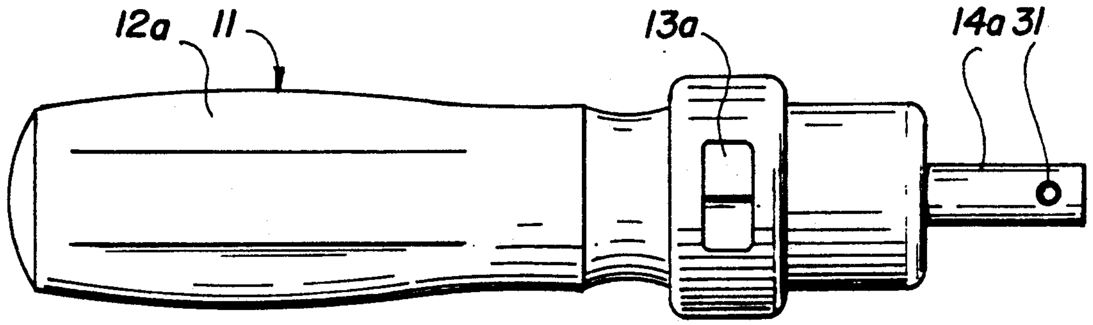
FIG. 7 is a side elevational view of a screwdriver adapted for use with a secondary adapter.
Figure 8:
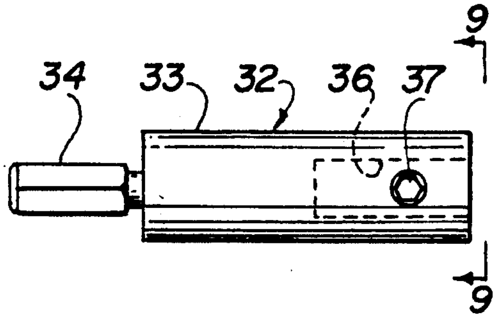
FIG. 8 is a side elevational view of a second adapter used with the screwdriver of FIG. 7.
Figure 9:
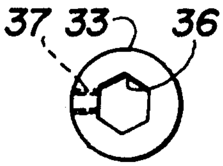
FIG. 9 is an end view taken substantially along the line 9—9 of FIG. 8.

FIGS. 7-9 show use of a secondary adapter 32. Preliminarily it should be understood that the shaft 14*a* of the screwdriver 12a is provided with a set screw 31 adjacent its outer end. Secondary adapter 32 has a body 33 and from one end thereof there projects a hexagonal stem 34 of greater length than the stem 24 which is received within the shaft 14a and held by the set screw 31. The opposite end of body 33 is formed with a hexagonal socket 36 and has a set screw 37. Socket 36 receives the stem 24 of adapter 21 which is secured in place by the set screw 37. Alternatively sock 36 may receive a hexagonal shank of a screwdriver blade or drill.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An adapter for use with a battery powered screw driver of the type having an output shaft having a non-circular first socket shaped to receive the shank of a screwdriver blade therein and a drill chuck formed with an internally threaded second socket, said adapter comprising:

a body having a first end formed with a third socket complementary to said output shaft for linear slidable engagement therewith and a stem centrally located in said third socket, said stem being shaped complementary to said first socket, said third socket having attachment means to detachably secure said body to said output shaft, said body having a second and opposite said first end having an externally threaded shank dimensioned to threadably engage said second socket.

2. An adapter according to claim 1 in which the distal end of said externally threaded shank is formed with a fourth socket dimensioned the same as said first socket and second attachment means to detachably secure a screwdriver blade in said fourth socket.

3. An adapter according to claim 1 in which said third socket is circular.

4. An adapter according to claim 1 in which said stem is hexagonal.

5. An adapter according to claim 1 in which said attachment means comprises a set screw threaded into said body transversely into said third socket.

6. An adapter according to claim 2 in which said second attachment means comprises a set screw threaded into said externally threaded shank transversely into said fourth socket.

7. An adapter according to claim 2 in which said adapter body is formed at its second end with a tapped hole, extending into said body from the bottom of said fourth socket, said tapped hole being threaded oppositely from said externally threaded shank to receive a left-hand thread screw extending through said second socket of said chuck.

8. An adapter according to claim 1 which further comprises a secondary adapter having a second body having a first end formed with a non-circular second stem shaped complementary to said first socket and a second end opposite said first end formed with a fourth socket complementary to said first-mentioned stem.

9. An adapter according to claim 8 which further comprises second attachment means to detachably secure a blade in said fourth socket.

10. An adapter according to claim 9 in which said second attachment means comprises a set screw threaded transversely into said fourth socket.

* * * * *